United States Patent [19]

Polenz et al.

[11] 4,283,253
[45] Aug. 11, 1981

[54] METHOD AND APPARATUS FOR PROCESSING FILLING GAS FROM A COKE OVEN BATTERY

[75] Inventors: Joachim Polenz, Essen; Hans Wagner, Kettwig, both of Fed. Rep. of Germany

[73] Assignee: Krupp-Koppers GmbH, Essen, Fed. Rep. of Germany

[21] Appl. No.: 188,281

[22] Filed: Sep. 18, 1980

[30] Foreign Application Priority Data

Oct. 24, 1979 [DE] Fed. Rep. of Germany ....... 2942962
Dec. 6, 1979 [DE] Fed. Rep. of Germany ....... 2949016

[51] Int. Cl.³ ............................................. C10B 27/04
[52] U.S. Cl. .......................................... 201/30; 55/85; 201/41; 202/254; 202/258; 202/263
[58] Field of Search .................. 201/30, 40, 41, 26, 201/29; 202/254, 255, 256, 257, 258, 259, 260, 261, 262, 263; 55/84, 85, 89

[56] References Cited

U.S. PATENT DOCUMENTS

| 4,010,079 | 3/1977 | Faber ............................ 202/263 X |
| 4,105,503 | 8/1978 | Bruce ............................ 201/40 |
| 4,110,168 | 8/1978 | Brice ............................ 201/41 X |
| 4,123,331 | 10/1978 | Laufhutte ....................... 201/41 X |
| 4,154,584 | 5/1979 | Ullrich .......................... 55/89 X |
| 4,157,940 | 6/1979 | Watson .......................... 201/41 X |

FOREIGN PATENT DOCUMENTS

| 2416558 | 10/1974 | Fed. Rep. of Germany ............. 201/40 |
| 2416524 | 11/1974 | Fed. Rep. of Germany ............. 201/41 |
| 1538859 | 1/1979 | United Kingdom ..................... 202/261 |
| 1540305 | 2/1979 | United Kingdom ..................... 202/255 |

*Primary Examiner*—Tim R. Miles
*Assistant Examiner*—Roger F. Phillips
*Attorney, Agent, or Firm*—Michael J. Striker

[57] ABSTRACT

An improved coke oven battery and an improved method for production of coke and byproducts are provided. The filling gas escaping during the filling of the oven chambers with coal is initially rendered inert by admixing flue gas. Then the resulting gas mixture of filling gas and flue gas is withdrawn via a conduit fed with flushing liquor from the coke oven gas off-take main and is added to the raw coke oven gas after the coke oven gas off-take main. The tar and coal containing flushing liquor coming from the filling gas conduit is fed back to the coke oven gas off-take main after removal of the tar.

21 Claims, 3 Drawing Figures

| 4,283,253

METHOD AND APPARATUS FOR PROCESSING FILLING GAS FROM A COKE OVEN BATTERY

BACKGROUND OF THE INVENTION

1. Field of the Invention

The present invention relates to an improved coke oven battery and to an improved method for production of coke and byproducts and more particularly to an improved processing of the filling gas.

2. Brief Description of the Background of the Invention Including Prior Art

All modern by-product coke ovens are constructed to take a definite volume of coal per charge and are charged from a larry car operating between overhead coal storage bins and the ovens. Improvements in larry cars have been directed toward making possible better charging practices. The aims of such improvements are for example to reduce charging time, to reduce the number of passes of the leveling bar necessary for leveling and to make a smokeless charge. Nevertheless there are still produced considerable amounts of filling gas during charging and filling operation of the ovens. It is known that the treatment of the filling gas escaping during the charging and filling procedure from the oven chambers provides a serious problem in view of the more severe regulations relating to environmental protection. The problem is further increased by a modern and increasing trend to charge and fill the oven chambers with preheated coal instead of the normal that is wet coal. However, the filling gas volume and the dust contents of the filling gas are thereby not inconsiderably increased. There has been no lack of proposals in the past for handling the problem of the filling gas sucking off and of its treatment. In pursuing this goal it has been proposed for example to burn the filling gas directly at an installation on the larry car for burning the filling gas. This method however encounters increasing difficulties for reasons of environmental protection and for plant safety reasons. It has also been proposed to withdraw the filling gas separately from the production gas, that is the raw coke oven gas, via a separate filling gas conduit and after performing a corresponding dedusting and tar removal to feel the filling gas either back into the oven or to add the filling gas to the raw coke oven gas.

The filling gas can be purified by a dry method employing cyclone precipitators and/or electrofilters or by a wet method employing washers. It is clear that separate provisions and apparatus for the purification of the filling gas cause additional capital and operating costs for the coke battery. In case washers are employed for this purpose in addition the run off washing liquid containing the dust and tar constituents of the filling gas has to be purified in a separator such as a decanter before the washing liquid can be employed again for treating the filling gas in the washer.

SUMMARY OF THE INVENTION

Purposes of the Invention

It is an object of the present invention to improve the coke oven battery to reduce capital and operating costs for purification of the filling gas.

It is another object of the present invention to improve the operational safety and the environmental contamination of a coke oven battery.

It is a further object of the present invention to provide a method for the filling gas of a coke oven which is independently useable of the water content of the coal employed.

These and other objects and advantages of the present invention will become evident from the description which follows.

Brief Description of the Invention

The present invention provides an improved method for production of coke and byproducts. A coke oven chamber of a coke oven battery with horizontal chambers is filled with coal and the filling gas generated during filling is withdrawn separately from the coke oven gas. Flue gas is added to the filling gas for rendering the resulting gas mixture of the filling gas and the flue gas relatively inert. The gas mixture is withdrawn through a conduit fed with flushing liquor from the gas off-take main and then the gas mixture of filling and flue gas is admixed to the raw coke oven gas. The coal and tar containing flushing liquor coming from the conduit is fed into a thick tar separator and after separation of tar and coal the flushing liquor is returned to the flushing liquor coming from the gas off-take main. The adding of of the flue gas can be performed by putting it into the suction hood of the larry car and/or by adding it via the leveling door into the oven chamber and/or by adding the flue gas into the pipe employed for withdrawing the filling gas. The flue gas added for rendering the resulting gas mixture inert can be withdrawn from the flue channel of the coke oven battery. The preferable amount of flue gas added is from about 10 to 20 Nm$^3$ for each Nm$^3$ of filling gas. A preferable amount of flushing liquor fed to the conduit is from about 10 to 15 liters for each Nm$^3$ of the gas mixture of the filling gas and the flue gas. The gas mixture of the filling gas and of the flue gas can be cooled to a temperature of from about 40° to 70° C. before being admixed to the raw coke oven gas. Additionally, the gas mixture of filling and flue gas before its admixture to the raw coke oven gas can be subjected to an aftertreatment in a washer operated with flushing liquor wherein from about 5 to 10 liter flushing liquor are employed for each Nm$^3$ of the gas mixture. The thick tar separator of the coke oven process can be coemployed for the tar separation of the flushing liquor withdrawn from the conduit. The gas mixture can be withdrawn through a gas-liquid conduit disposed at a slight angle which conduit has its connecting flange attached to the suction hood of the filling car. The filling gas can alternatively be withdrawn via a standpipe provided with a switching mechanism or through an additional opening in the cover of the coke oven.

There is also provided by the present invention an improved coke oven battery. The coke oven has a gas off-take main for collecting fluid products from the coke oven. A pipe is connected to the gas off-take main for carrying the raw coke oven gas and a thick tar separator of the coke oven battery is connected to the gas off-take main. The coke oven has a filling port at its top and a flue channel for removing flue gas. A first conduit is connected to the location of the development of coke oven filling gas for withdrawing the same separately from the coke oven gas and has an output port. A second conduit runs from the flue channel to an input port connected to the coke oven for feeding flue gas to be added to the filling gas for providing a relatively inert gas mixture. A gas-liquid conduit is disposed at a slight angle and connected on one side to the output port for receiving the relatively inert gas mixture and connected on the other side to the pipe carrying the raw coke oven gas and is further connected on its upper side to the thick tar separator for receiving flushing liquor and connected on its lower side to a thick tar separator for providing flushing liquor loaded with tar to the thick tar separator. The input port for feeding flue gas can be provided by the leveling door of the coke oven chamber and/or can be disposed at the suction hood of the filling car and/or at the first conduit. In addition a washer can be connected between the gas-liquid conduit and the raw coke oven gas pipe for subjecting the gas mixture of filling and flue gas to an aftertreatment. The first conduit can be connected to the suction hood of the filling car or to an additional opening in the coke oven cover. Alternatively, the first conduit can be a standpipe on the coke oven provided with a switching mechanism.

BRIEF DESCRIPTION OF THE DRAWINGS

In the accompanying drawings in which are shown several of the various possible ebodiments of the invention.

DETAILED DESCRIPTION OF THE PREFERRED EMBODIMENTS

Figure 1:
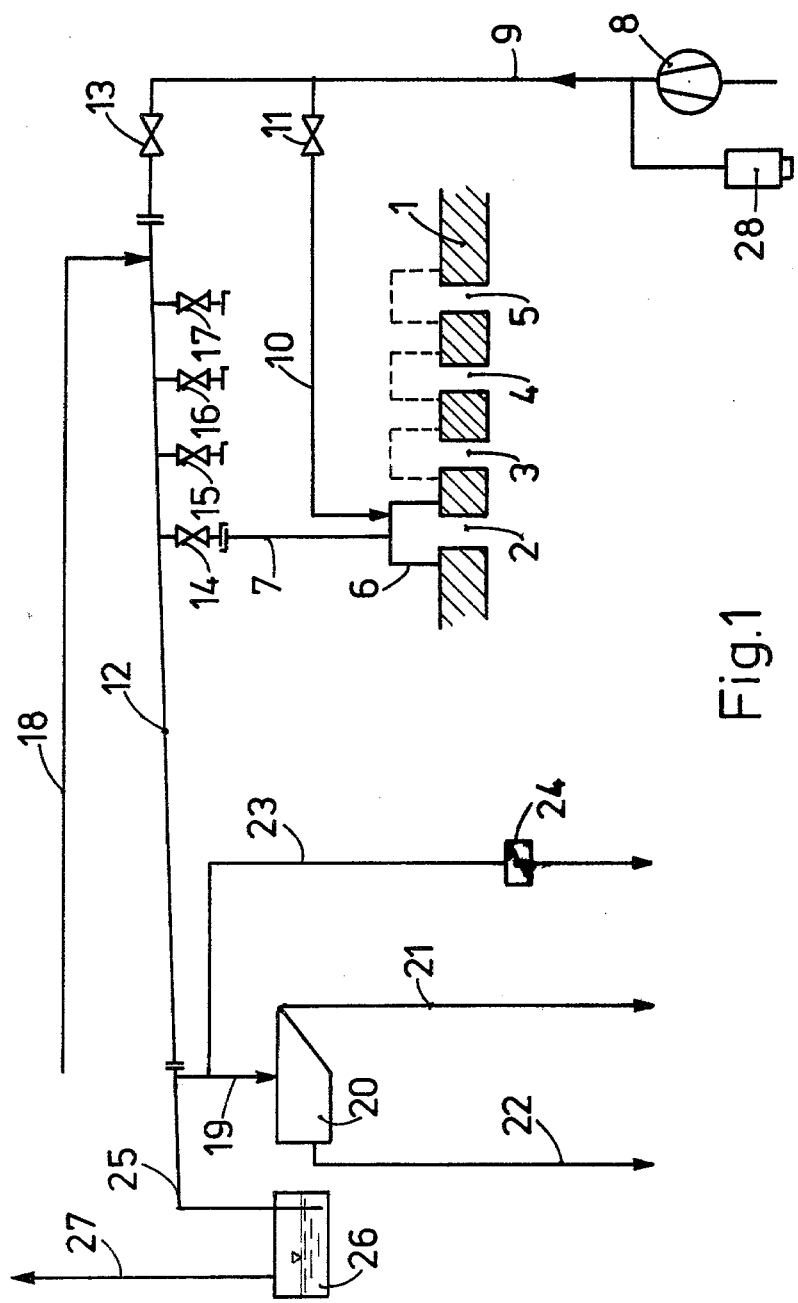
FIG. 1 is a schematic diagram of part of a coke oven wherein the filling gas is sucked off via the suction hood of the filling car and through a gas-liquid conduit.

In accordance with the present invention there is provided a coke oven battery with horizontal chambers wherein the filling gas escaping during the charging and filling process is withdrawn separately from the production gas and is admixed to the raw coke oven gas together with flue gas after the solid materials and tar constituents contained therein have been precipitated. The filling gas is rendered relatively inert by admixing of flue gas and the resulting gas mixture is withdrawn via a conduit for the filling gas which is fed with flushing liquor from the gas take-off main and following the resulting gas mixture of filling gas and flue gas is admixed to the raw coke oven gas. The coal and tar containing flushing liquor running of from the conduit is fed to a thick tar separator and after the tar separation fed back to the coke oven battery.

Flushing liquor is liquor which has been condensed in the mains of the coke oven, has been collected and circulated and cools and condenses various vapors in foul gas thus providing a carrying medium for the condensable tars and other compounds formed in the operation. These liquid materials can flow from a collecting main through a seal into a downcomer and are delivered through the return flushing liquor lines to a collecting unit customarily called a flushing liquid decanter. Of course it is also possible to employ as a flushing liquor other wash waters.

The constant removal of gases such as filling gas, flue gas, gas mixture and raw coke oven gas is controlled by varying the speeds of the turbines and exhausters which pull the gases and by automatic pressure regulators in the mains. The control of pressure is also for for the purpose of eliminating the infiltration of atmospheric air or gases from from other areas into the system, which would have a deleterious effect on the process and the resulting coke and coal chemicals. Preferably desired pressure differentials are maintained by use of either low speed positive turbo or centrifugal type exhausters constructed to remove gases and vapors at a controlled rate.

In the process according to the present invention the filling gas is initially rendered inert by flue gas addition to provide the required safety to the plant. Preferably flue gas from the waste heat flue of the coke oven battery is employed. The addition of flue gas can be performed in a suitable way and preferably by introducing it through the leveling door into the oven chamber and/or by introducing it into the suction hood of the filling car and/or by introducing it directly into the filling gas conduit. The flue gas amount is such as to reduce the ignition region of the resulting gas mixture of filling gas and flue gas to zero and thus the upper and lower ignition limit coincide. This mixture thus cannot be ignited even with increased addition of air any longer. It has been found that for rendering the filling gas inert depending on the residue contents in oxygen the amount of flue gas required can be from about 10 to 20 $Nm^3$ of flue gas for each $Nm^3$ of filling gas.

The gas mixture rendered inert is withdrawn through a filling gas line which is in accordance with the present invention fed with flushing liquor from the coke oven gas take-off main and the amount of flushing liquor employed is preferably from about 10 to 15 liters for each $Nm^3$ of the gas mixture of filling gas and flue gas. This flushing liquor, which always comprises a certain amount of ammonia, serves on the one hand to avoid the formation of tar and coal deposits in the filling gas line and on the other hand to simultaneously precipitate these components in part from the gas mixture of filling gas and flue gas. The filling gas conduit is installed at a slight angle for providing a flow to the tar and coal containing flushing liquor resulting from the gas treatment into the thick tar separator. As a thick tar separator is preferably employed the thick tar separator already present in the coke oven battery. After the tar separation has been performed as planned the flushing liquor is fed back to the coke oven gas take-off main.

There are several possibilities for the withdrawal of the filling gases from the coke oven to the filling gas conduit:

It is possible to withdraw the filling gases from the coke oven battery via the suction hood of the filling car from the coke oven battery, wherein the filling gas conduit is a so called andock line, that is a line having a connecting piece. The connecting pieces are disposed in a corresponding position above the filling openings of the coke oven battery so that the suction hood of the filling car can find in each position of the filling car a corresponding connecting piece of the andock line. Of course the problem of a connection between the suction hood of the filling car and the filling gas line can also be solved in other ways such as for example by a flexible connecting pipe.

In addition the withdrawal of the filling gas can be performed via the standpipe present in the coke oven battery, which standpipe is in this case provided with a switching mechanism. During the removal of the filling gases the switching mechanism is set such that the filling gases cannot get into the gas off-take main of the coke oven but in fact run through a conduit provided for this purpose to the filling gas conduit.

Furthermore, it is also possible to perform the removal of the filling gases through an additional opening of the cover of the coke oven battery, which is connected directly to the filling gas line through a conduit provided with a valve. Since the additional opening for the removal of the filling gas is normally not provided in the cover of the coke oven battery, this embodiment is particularly suitable for new installations wherein such opening can be provided from the beginning.

Various embodiments of the present invention will be illustrated in connection with the simplified schematic drawings. These drawings contain only the components required for the illustration of the present invention, whereas all other installations of a coke oven battery and of a coke oven gas treatment process are not shown. Such other installations have been shown in numerous patents, books and articles.

Referring now to FIG. 1 there is shown the cover 1 of the coke oven battery. The cover 1 is provided with the filling openings 2 to 5. Depending on the step of the filling process the suction hood 6 of the filling car (not shown) is located above one of the filling openings.

In the FIG. 1 the position of the filling car over the opening 2 is shown with full lines whereas the position of the filling car and the suction hood over the cover openings 3 to 5 is indicated by dashed lines. During the filling procedure in total from about 5 to 15 $Nm^3$ of dry filling gas escape per minute. It has to be considered that when filling with wet coal some air can enter through the leveling door into the gas collecting room of the oven chamber concerned resulting in a partial burning of the developing filling gas with a large deficiency of air. In order to avoid that during the filling operation unnecessarily air enters through the annular slot between the filling tube and the filling hole into the suction hood 6, the suction hood 6 is under an overpressure of flue gas. The filling gas collecting under the suction hood 6 during the filling process has about the following composition:

$CO_2$: 3.5 volume percent
$C_nH_m$: 5.0 volume percent
$CO$: 6.9 volume percent
$H_2$: 40.0 volume percent
$CH_4$: 41.7 volume percent
$N_2$: 2.9 volume percent This gas together with possibly also present air as well as partially burned filling gas and flue gas is withdrawn via conduit 7 from the suction hood 6. For rendering the gas completely inert an amount of flue gas of about 15 $Nm^3$ per $Nm^3$ of filling gas is required in this case. The required flue gas is withdrawn from the waste heat flue of the coke oven battery with a blower 8 via the conduit 9. It could if necessary also be provided by a separate flue gas generator 28. From conduit 9 the conduit 10 branches, which goes to the suction hood 6 so that with a corresponding position of the valve 11 the flue gas in the amount required can be added to the filling gas still under the suction hood 6. The conduit 9 has a further connection to the filling gas conduit 12 so that with an appropriate position of the valve 11 the flue gas is not admixed to the filling gas till said filling gas reaches the filling gas conduit 12. Of course the valves 11 and 13 can be positioned such that a flue gas addition is provided both in the suction hood 6 and in the filling gas conduit 12.

The filling gas conduit 12 is in this case as indicated in the drawing formed as a so called andock conduit and provided with the connecting pieces 14 to 17 as a manifold, which connecting pieces are located in corresponding position above the filling openings 2 to 5 such that the suction hood 6 finds a corresponding connecting piece in the filling conduit 12 for each position of the filling car.

In accordance with the invention from conduit 18 from about 10 to 15 liters of flushing liquor per $Nm^3$ of gas mixture filling gas and flue gas are provided to the filling gas conduit 12, which is constructed as a gas-liquid line for carrying and possibly scrambling liquids and gases simultaneously. This flushing liquor, which comes from the coke oven gas off-take main (not shown) comprises about 6 kg of ammonia per $m^3$. The addition of flushing liquor reduces the temperature of the gas mixture in the filling gas conduit 12 to about 80° C. Since this line has been installed with a slope of about 10 mm/m, the tar and coal containing flushing liquor flows via the connecting piece 19 into the so called thick tar separator 20. The construction of the thick tar separator can comprise as is known a scraping conveyer such that the so called thick tar is carried out at the upper part of the thick tar separator 20 and is withdrawn via the conduit 21. At the same time the flushing liquor and the other tar are carried via conduit 22 to the condensate deep container of the coke oven gas treatment process. After phase separation occurs and removal of the tar the flushing liquor is then conventionally fed back to the coke oven gas off-take main (not shown) and is ready for renewed addition to the filling gas conduit 12.

The gas mixture of filling and flue gas substantially freed from tar and coal containing impurities is withrawn via the conduit 23 in the meantime. This gas mixture is during the filling process at a temperature of about 70° C. added to the raw coke oven gas behind the gas off-take main. In case the normally required temperature of from about 40° to 70° C. has not been reached at the entrance into the line 23 already, then the temperature of the gas mixture can be correspondingly lowered in a cooling installation (not shown).

The throttle valve 24 is disposed in conduit 23 and is closed during the filling intervals, that is the times when the filling process is interrupted and the filling car moves from one filling hole to another. In order to maintain the inert gas pressure in the system also during the filling intervals, no interruption of the flue gas feed occurs during the filling intervals. During this time the gas from the filling gas conduit 12 passes via the conduit piece 25 into the submerging vessel 26 and can then be withdrawn from there via the conduit 27 into the waste heat flue (not shown) and chimney.

The admixture of gas mixture of filling gas and flue gas during the filling time to the raw coke oven gas reduces its heating value by from about 2 to 5 percent. It has been found however that this decrease of the heating value does not result in affecting the use possibilities of the resulting gas mixture. This is true in particular when the gas is employed within the heating system of a steel mill.

Figure 2:
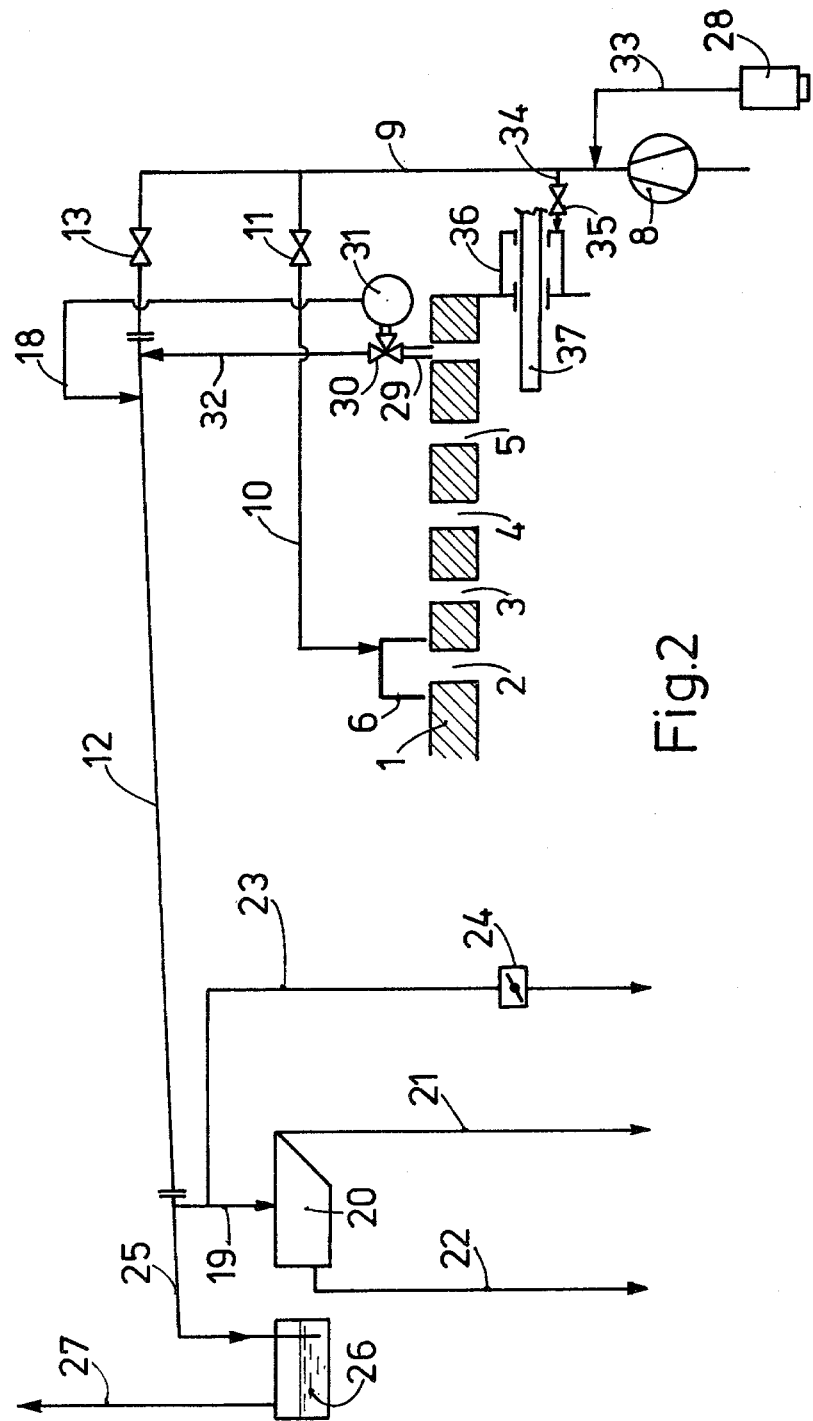
FIG. 2 is a schematic diagram of part of a coke oven wherein the filling gas is sucked off via a standpipe of the coke oven battery provided with a switching mechanism.

In the embodiment shown in FIG. 2 the cover of the coke oven battery is again designated as 1. The filling holes 2 to 5 are provided in the cover 1. Depending on the step of the filling process the suction hood 6 of the filling car (not shown) can be located above one of the filling holes. In FIG. 2 this filling hole is the hole 2. In total, from about 5 to 15 $Nm^3$ dry filling gas per minute escape during the filling process. The withdrawal of the filling gas is achieved in this case however via the provided standpipe 29 which is constructed with a switching mechanism 30. The switching mechanism is positioned during the withdrawal of the filling gas such that the same cannot pass into the gas off-take main 31, but flow via the conduit 32 to the filling conduit 12. The flue gas required for rendering the filling gas inert is here also taken from the waste heat flue (not shown) of the coke oven battery by way of the blower 8 and conduit 9. If necessary the flue gas could be provided by a separate flue gas generator 28 and be fed into conduit 9 via conduit 33. From this branches off initially conduit 34 through which with appropriate position of the valve 35 flue gas can enter the coke oven chamber via the leveling door. The leveling bar is designated as 37. Additional flue gas can be withdrawn via conduit 10 with appropriate position of the valve 11 and thereby passes into the suction hood 6 of the filling car generating there the necessary flue gas elevated pressure for avoiding unnecessary entrance of air during the filling process into the suction hood 6. Finally, conduit 9 has also a connection to the filling gas conduit 12 such that with a corresponding position of the valve 13 the flue gas is not added to the filling gas till said filling gas reaches the filling gas conduit 12. Of course, by a corresponding position of the valves 35, 11 and 13 the addition of flue gas to the individual entrance places can be distributed as desired or adjusted, respectively. For the purpose of a fully rendering inert of the filling gas the amount of flue gas to be added in this case has to be about 15 $Nm^3$ flue gas per $Nm^3$ filling gas. The filling gas collecting during the filling process in the gas collection room of the coke oven battery is withdrawn together with air possibly present as well as partially combusted filling gas and flue gas via the standpipe 29 from the gas collection room of the coke oven chamber. The gas mixture passes into the filling gas line 12 via the conduit 32. The conduit 32 is stationary disposed and provides a solid connection between the standpipe 29 and the filling gas conduit 12.

The temperature of the gas mixture withdrawn via conduit 32 is reduced to about 80° C. in the filling gas conduit 12 by addition of flushing liquor from conduit 18. The remaining further treatment of the gas mixture and of the flushing liquor corresponds essentially to the procedure described in connection with FIG. 1. Therefor reference is made to the corresponding description, wherein corresponding reference numerals in the figures have the same meaning.

Figure 3:
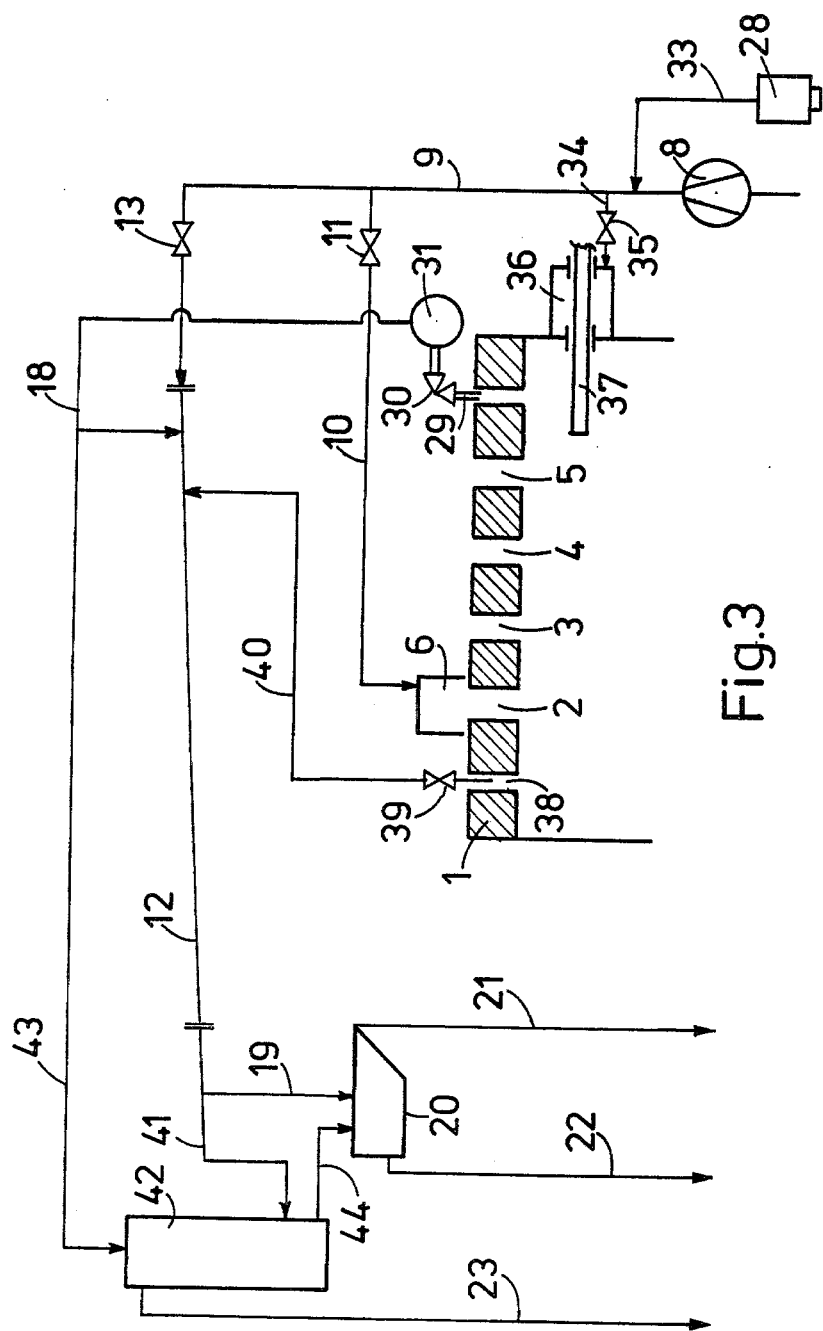
FIG. 3 is a schematic diagram of part of a coke oven wherein the filling gas is withdrawn through an additional opening in the cover of the coke oven and wherein the resulting gas mixture of filling gas and flue gas is aftertreated in a washer fed with flushing liquor.

In the embodiment shown in FIG. 3 the withdrawal of the filling gases is performed via an additional opening 38 in the oven cover 1. This opening 38 is in direct connection with the filling gas conduit 12 via valve 38 and conduit 40. During the withdrawal of the filling gas via the opening 38 and the conduit 40 the coke oven gas off-take main 31 is closed off by actuation of the switching mechanism 30 so that no filling gas can pass into the coke oven gas off-take main 31.

The embodiment of FIG. 3 relates also to a variation of the process wherein the gas mixture of filling gas and flue gas withdrawn from the filling conduit 12 is subjected initially and before the admixture to the raw coke oven gas to an aftertreatment involving a washing with flushing liquor from the coke oven gas off-take main 31. For this purpose the gas mixture is fed from the filling gas conduit 12 via line 41 into the washer 42, which is passed by the gas mixture from top to bottom. As a countercurrent flushing liquor in an amount of from about 5 to 10 liter per $Nm^3$ gas mixture of filling gas and flue gas is entered into the washer 42. The flushing liquor feed is provided by conduit 43 which branches off from the conduit 18. The washer can be constructed with usual features and the aftertreated and purified gas mixture is withdrawn at the top of the washer 42 and passes via conduit 23 to the raw gas stream behind the coke oven gas off-take main 31. The flushing liqour running of the washer 42 and loaded with impurities separated from the gas flows in the mean time via conduit 44 into the thick tar separator 20 where it is united with the through connection piece 19 flowing in flushing liquor containing tar and coal and coming from the filling gas conduit 12. The further treatment in the thick tar separator 20 is performed in the way described above and the thick tar is withdrawn via conduit 21 and the flushing liquor and the other tar are withdrawn via conduit 22. Also the other treatment of the filling gas corresponds to the process described in connection with FIG. 1. Of course, to the process steps described in connection with FIG. 3 there can for example be added the submerging vessel 26 presented in FIGS. 1 and 2 and the throttle valve 24 can be disposed in conduit 23 for avoiding to interrupt during the filling interval the feed of flue gas.

The method and apparatus of the present invention allow to perform the filling gas treatment by employing substantially units already present in conventional coke oven gas treatment processes. Thus the capital and operating costs are extremely low and furthermore is the invention process characterized by a high plant safety and is environmentally very acceptable.

From the above it will be understood that the foregoing description is merely illustrative of preferred embodiments of the present invention, and that variations may be made in such embodiments by those skilled in the art without departing from the spirit and purview thereof.

What is claimed is:

1. An improved method for production of coke and byproducts comprising filling with coal a coke oven chamber of a coke oven battery having horizontal chambers and a coke oven gas off-take main;

withdrawing the filling gas generated during coking of said coal generated during filling separately from the coke oven gas;

adding flue gas to the filling gas for rendering the resulting gas mixture of the filling gas and the flue gas relatively inert;

withdrawing said gas mixture through a filling gas conduit fed with flushing liquor withdrawn from the coke oven gas off-take main;

admixing said gas mixture of the filling and flue gas to the raw coke oven gas;

feeding the tar and coal containing flushing liquor coming from said filling gas conduit into a thick tar separator; and returning the flushing liquor after separation of tar and coal to the flushing liquor coming from the gas off-take main.

2. The improved method as set forth in claim 1 wherein the adding of the flue gas is performed via the leveling door into the oven chamber.

3. The improved method as set forth in claim 1 wherein the adding of the flue gas is performed into the suction head of a filling car.

4. The improved method as set forth in claim 1 wherein the adding of the flue gas is performed into said filling gas conduit.

5. The improved method as set forth in claim 1 wherein the flue gas added for rendering the resulting gas mixture inert is withdrawn from a flue channel of the coke oven battery.

6. The improved method as set forth in claim 1 wherein the amount of flue gas added is about from 10 to 20 $Nm^3$ for each $Nm^3$ of filling gas.

7. The improved method as set forth in claim 1 wherein the amount of the flushing liquor fed to the conduit is about 10 to 15 liters for each $Nm^3$ of gas mixture of the filling gas and the flue gas.

8. The improved method as set forth in claim 1 wherein the gas mixture of the filling and the flue gas is cooled to a temperature of from about 40° to 70° C. before being admixed to the raw coke oven gas.

9. The improved method as set forth in claim 1 further comprising
subjecting the gas mixture of filling and flue gases before admixture to the raw coke oven gas to an aftertreatment in a washer operated with flushing liquor wherein from about 5 to 10 liter flushing liquor are employed for each $Nm^3$ of gas mixture.

10. The improved method as set forth in claim 1 wherein a thick tar separator of a coke oven gas treatment system is coemployed for the tar separation of the flushing liquor withdrawn from the filling gas conduit.

11. The improved method as set forth in claim 1 wherein the filling gas is withdrawn via the suction hood of a filling car and through said filliing gas conduit, said conduit being disposed at a slight angle downward from horizontal with respect to the flow therein.

12. The improved method as set forth in claim 1 wherein the filling gas is withdrawn via a standpipe provided with a switching mechanism for selectively routing filling gas to said filling gas conduit and routing coke oven gas to said coke oven gas off-take main.

13. The improved method as set forth in claim 1 wherein the filling gas is withdrawn through an additional opening in the oven cover of the coke oven battery separate from the opening for drawing off coke oven gas.

14. An improved coke oven battery comprising
a coke oven;
a gas off-take main of the coke oven for collecting fluid products from the coke oven;
a pipe connected to the gas off-take main for carrying the raw coke oven gas;
a thick tar separator of the coke oven battery connected to the gas off-take main;
a flue channel connected to the coke oven for removing flue gas;
a filling port at the top of the coke oven;
a first conduit connected to the coke oven at the location of the development of coke oven filling gas for withdrawing the filling gas separately from the coke oven gas and having an output port;
an input port connected to the coke oven for adding flue gas to the filling gas for providing a relatively inert gas mixture;
a second conduit running from the flue channel to the input port for feeding flue gas;
a gas-liquid conduit disposed at a slight angle connected on one side to the output port for receiving the relatively inert gas mixture and connected on the other side to the pipe carrying the raw coke oven gas; and connected on the upper side to the thick tar separator for receiving flushing liquor and connected on the lower side to a thick tar separator for providing flushing liquor loaded with tar to the thick tar separator.

15. The improved coke oven battery as set forth in claim 14 wherein the input port for feeding flue gas is provided by the leveling door of the coke oven chamber.

16. The improved coke oven battery as set forth in claim 14 wherein the input port for the flue gas is disposed at the suction hood of the filling car.

17. The improved coke oven battery as set forth in claim 14 wherein the input port for the flue gas is disposed at the first conduit.

18. The improved coke oven battery as set forth in claim 14 further comprising
a washer connected between the gas-liquid conduit and the raw coke oven gas pipe for subjecting the gas mixture of filling and flue gas to an aftertreatment.

19. The improved coke oven battery as set forth in claim 14 wherein the first conduit is connected to the suction hood of the filling car.

20. The improved coke oven battery as set forth in claim 14 wherein the first conduit is a stand pipe on the coke oven provided with a switching mechanism.

21. The improved coke oven battery as set forth in claim 14 wherein the first conduit is connected to an additional opening in the coke oven cover.

* * * * *